Patented May 20, 1941

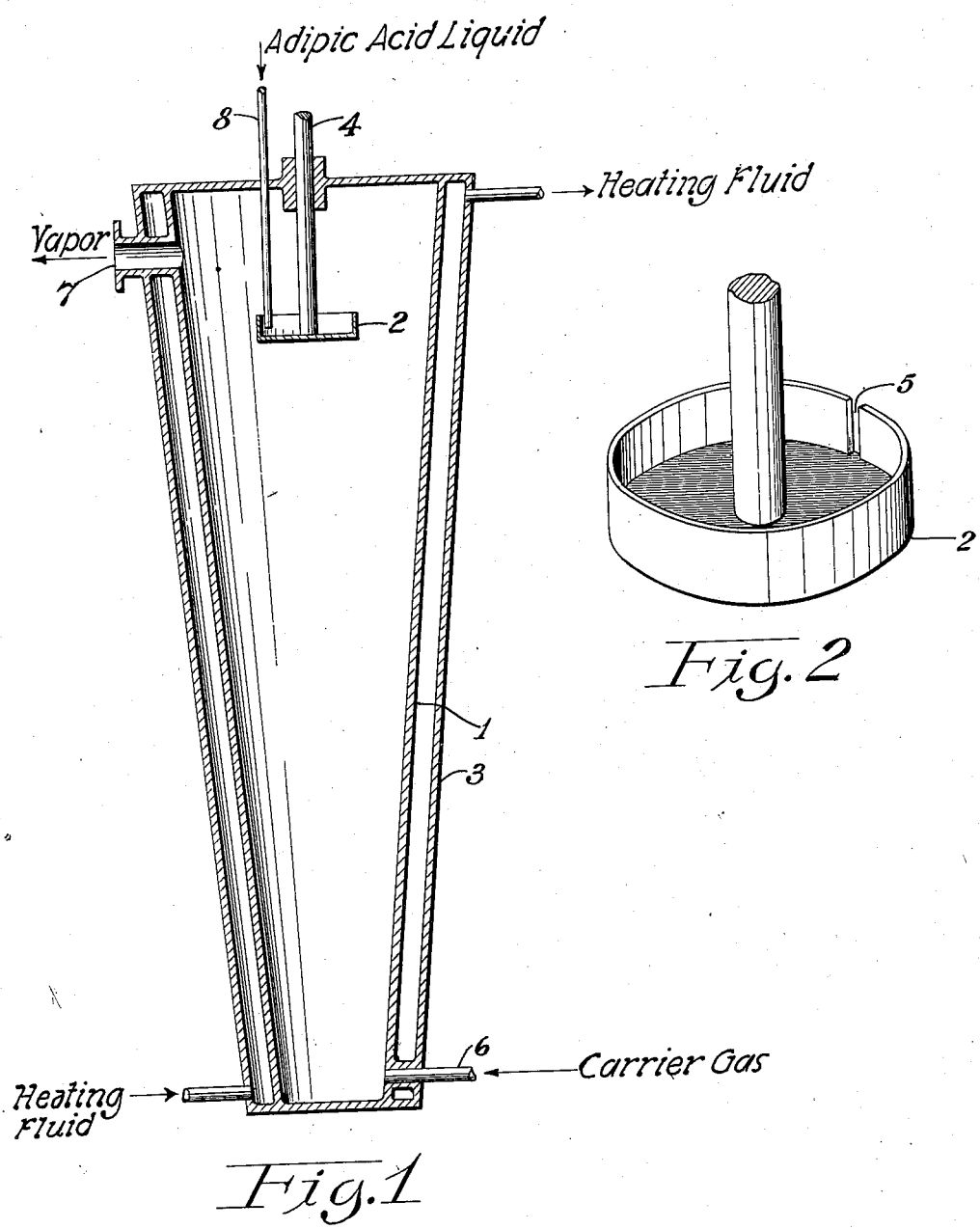

2,242,466

UNITED STATES PATENT OFFICE 2,242,466

PROCESS FOR VAPORIZATION OF ADIPIC ACID

Crawford H. Greenewalt and Hood Worthington, Wilmington, Del., assignors to E. I. du Pont de Nemours & Company, Wilmington, Del., a corporation of Delaware Application September 30, 1938, Serial No. 232,503

8 Claims. (Cl. 260—537)

This invention relates to continuous vaporization processes, and more particularly to procedures for the vaporization of adipic acid. More specifically, this invention relates to an improved process for converting adipic acid to adipic acid vapor with a minimum of degradation and carbonization reactions.

Adipic acid, in common with many other high boiling organic compounds, has a tendency to become unstable and to undergo severe decomposition reactions at temperatures approaching its atmospheric pressure boiling point. For example, Aschan (Ann. 383, 58 (1911)) has studied the distillation of adipic acid under atmospheric pressure in the presence of carbon dioxide and found that anhydride formation does not occur to any appreciable extent, and that the acid is degraded in part to cyclopentanone and in part to δ-4,5-pentenoic acid. Atmospheric pressure distillation of adipic acid is accompanied not only by the formation of the above transformation products, but the liquid in the flask rapidly undergoes carbonization and will eventually char.

The common method of avoiding the degradation reactions is to carry out the vaporization under diminished pressure, but this procedure is more suited to laboratory than to commercial practice which involves large installations of apparatus.

In copending application, Serial No. 133,275, filed March 26, 1937, there is disclosed a process for the manufacture of adiponitrile from adipic acid, which comprises passing a gaseous mixture of ammonia and adipic acid over an active dehydrating catalyst at elevated temperatures. In this process, or in other processes involving the use of gaseous adipic acid as one of the reactants, it is exceedingly important from the standpoint of yields to accomplish the vaporization step with a minimum of decomposition. Moreover, for continuous operation over long periods of time it is equally important to carry out the vaporization while avoiding the formation of carbon or hard carbonaceous deposits to any appreciable extent as previously indicated. It is seldom convenient or practicable to accomplish this on a commercial scale by operating under diminished pressure.

It is an object of this invention to provide a process for the continuous volatilization of adipic acid. Another object is to provide a process for vaporizing adipic acid which is capable of operation over extended periods of time. A further object is to accomplish the vaporization of adipic acid under atmospheric pressures, while substantially avoiding the formation of pyrolysis products. Other objects will appear hereinafter.

These objects are accomplished by bringing adipic acid into thermal contiguity with a heat transfer medium maintained at a temperature above the boiling point of the acid, said heat transfer medium being characterized by having a capacity for transferring heat to the acid in an amount in excess of that required for complete vaporization of the acid within a period of time short of that required to produce appreciable decomposition of the acid.

The preferred embodiments of the invention are more clearly defined in the following selected examples which, together with the accompanying drawing, are to be regarded as illustrating but in no way as limiting the invention.

Figure I represents a vaporizing device comprising a vertically mounted, closed, elongated, conical tube 1 provided with an inlet 6 at or near the bottom and an outlet 7 and inlet 8 at or near the top thereof. At the top of the conical tube 1 is a rotatable, vertical shaft 4 extending downwardly within the conical tube 1 to a point below the outlet 7. To the end of the shaft 4, within the conical tube 1, is attached a distributing dish 2, having a slot 5, as shown in Figure II. Figure II represents a perspective view of the dish 2 of Figure I containing a slot 5. The conical tube 1 is surrounded by a closed annular space 3 within which liquid or other heating means is contained.

*Example I.*—A device for vaporizing adipic acid is constructed somewhat as follows: A conical tube 1 about 4' in length, 10" in diameter at the large end, and 4" in diameter at the small end is mounted vertically with the apex of the cone at the bottom. The tube 1 is provided with a gas inlet 6 at the bottom, a vapor outlet 7 2" in diameter at a point four inches from the top, and each end is sealed with heavy Van Stone-type closures. To the center of the top cover is bolted a suitable stuffing box assembly in which a power driven shaft 4 is operated. To the bottom of the shaft 4, which extends to a point about four inches below the outlet pipe 7, is attached a shallow metal dish 2 4" in diameter and ½" in depth having a narrow slot 5 about ⅛" wide in the rim. The entire vaporizing tube 1, is provided with facilities for heating to temperatures in the neighborhood of 350° C., preferably by means of a fluid heat transfer medium contained within the annular space 3. The following experiment is typical of the operation of this device. The conical tube 1 is heated to a temperature of 350° C., and ammonia gas preheated to a temperature of 500° C. is introduced at the rate of 1785 g./hr. through the gas inlet tube 6 at the bottom. Molten adipic acid is pumped in at the rate of 958 g./hr. through a small inlet tube 8, which extends to a point just above the surface of the rotating dish 2. The shaft 4 and dish 2 are operated at a speed of approximately 200 R. P. M. The acid travels rapidly across the surface of the dish 2 through the slot 5 and is distributed evenly to the walls of the vaporizing tube 1 in fine droplets. Upon coming in contact with the walls these droplets are vaporized instantaneously without charring.

The resulting vapor mixture of adipic acid and ammonia is passed through the outlet pipe 7 to a water scrubbing column not shown where it is dissolved completely to form a solution of ammonia and ammonium adipate. The efficiency of the vaporization procedure is determined by recovering unchanged adipic acid from the ammoniacal solution. From 5744 g. of adipic acid processed during a period of six hours there is recovered 5420 g. of adipic acid corresponding to 94.25% of theory. Less than 20 g. of carbonaceous material is deposited in the vaporizing tube.

The following experiment illustrates the operation of this device in the synthesis of adiponitrile from adipic acid. Ammonia and adipic acid are passed into the vaporizer at the rates of 1 kg. and 2 kg./hr., respectively. The vapor mixture formed as described above is passed from the vaporizer through a heated transfer pipe to an annular chamber containing 9 liters of 4–8 mesh silica gel catalyst heated to a temperature of 345° C. In passing through the catalyst bed the vapor mixture is dehydrated smoothly to yield a product which on condensation consists mainly of adiponitrile. From 95.76 kg. of adipic acid processed during 44.5 hours there is obtained 70.4 kg. of oily product that on distillation yields 54.3 kg. of adiponitrile, B. P. 155° C./10 mm. This corresponds to a molecular yield of 76.7% of theory.

*Example II.*—A vaporizer tube 1 similar to that referred to in Example I is closed at the top with a heavy blank flange and fitted at the bottom with a spray nozzle of the type commonly employed in paint spray guns. This device consists essentially of two concentric openings, an inner fluid orifice and an outer gas orifice. The fluid tip is mounted on an adjustable screw so that the size of the gas orifice can be varied. In operating this device compressed gas is forced through the outer orifice and expanded to atmospheric pressure. Liquid is fed to the fluid tip where it is picked up by the expanding gas stream and instantly atomized to give fine droplets. The mixture of gas and atomized liquid forms a cone of spray with its apex at the nozzle. This device serves to vaporize adipic acid in the following manner: Ammonia under a pressure of 25–30 lbs./sq. in. is preheated to a temperature of 450–500° C. and expanded to atmospheric pressure through the gas orifice of the spray nozzle. Molten adipic acid at a temperature of approximately 170° C. is pumped at a uniform rate through the fluid orifice. The relative ammonia and adipic acid rates are adjusted so that the sensible heat of the quantity of ammonia passed in a given interval of time is equal to or greater than the amount of heat required to convert the adipic acid pumped in the same interval of time to vapor at a temperature of about 350° C. Owing to the concentric construction of the spray nozzle, the narrow feed line leading to the fluid orifice is surrounded by an annular space through which the superheated ammonia is passed. As a consequence much of the necessary heat transfer from ammonia to the acid takes place through the walls of the feed line, and a substantial part of the adipic acid is volatilized before it leaves the fluid orifice. The remainder is converted to very fine droplets heated to a temperature at or near the boiling point, and on coming in contact with the hot walls of the mixing chamber 1 (Figure I) these droplets are transformed instantly to vapor. In this process the length of time that liquid adipic acid remains in contact with a heat transfer medium at a temperature above its decomposition temperature is seldom more than a few seconds. A practical illustration of the efficiency of this device is provided by the following experiment: Molten adipic acid and ammonia are fed to the spray nozzle at the rates of approximately 1 kg. and 2 kg./hr., respectively, during a period of 23 hours. The vapor mixture produced is passed continuously to a separate reactor chamber containing 9 liters of 4–8 mesh silica gel catalyst heated to a temperature of 345° C. The gases issuing from the reactor chamber are condensed to form two liquid layers, an upper layer comprising essentially adiponitrile, and a lower aqueous layer. Vacuum fractional distillation of the oil layer obtained from 20.78 kg. of adipic acid yields 12.3 kg. of pure adiponitrile, B. P. 155° C./10 mm., which corresponds to a molecular yield of 80.03% of theory.

*Example III.*—A heat transfer device is constructed as follows: Twelve feet of $\frac{1}{16}''$ I. D. copper tubing is wound into a helix and mounted in a compact tubular steel diphenyl-diphenyl oxide vapor bath with the axis of the coil tilted to an angle of 45°. The ends of the coil extend outside the top and bottom plates of the vapor bath and serve as fluid inlet and vapor outlet, respectively. This device effects the vaporization of adipic acid in the following manner: The coil is heated to a temperature of about 370° C. by operating the vapor bath under pressure. Molten adipic acid is pumped or fed from a blowcase into the fluid inlet of the coil at a temperature of about 175° C. On passing through the superheated coil, the adipic acid is converted rapidly to vapor, so that with a rate of 25 g./min. a pressure drop of approximately 19 lbs./sq. in. is developed. The adipic acid issuing from the gas orifice is completely vaporized at a temperature of approximately 350° C., and 95–99% of the adipic acid processed can be recovered therefrom. Owing to the turbulence of the flow in the heat transfer coil, the inner walls remain clean, and the device can be operated over long periods of time without plugging. This device can be employed conveniently in connection with the synthesis of adiponitrile by attaching it directly to a mixing chamber of the type referred to in Example I and II. If, for example, adipic acid is vaporized at the rate of approximately 1 kg./hr., mixed with ammonia gas, which is passed into the mixing chamber at the rate of 2 kg./hr., and said vapor mixture is passed over silica gel catalyst heated to a temperature of about 345° C., there is obtained from 46.54 kg. of adipic acid, processed during 47.5 hours, a crude product containing 25.445 kg. of pure adiponitrile. The molecular conversion is 76% of theory.

Although in the foregoing examples certain specific devices for carrying out the process of the invention have been described, it will be obvious to one skilled in the art that many modifications and variations thereof can be employed without departing from the spirit and scope of the invention. The process of this invention may be carried out with or without the use of a carrying gas. Thus, although ammonia has been shown in the examples, other carrier gases such as nitrogen or carbon dioxide may be advantageously employed.

Broadly speaking, in the practice of this invention it is desirable to maintain the heat transfer medium at a temperature of at least 25° C. above the boiling point of adipic acid, which is about 312° C. at atmospheric pressure. The exact temperature to be used will be determined to a considerable extent by the type of apparatus employed. As pointed out above, adipic acid is very unstable at its atmospheric pressure boiling point. As a consequence, it is exceedingly important that the vaporization shall be accomplished within the space of a very few seconds in order to avoid such decomposition.

Although it is readily apparent that the process of the invention comprises a superior method for the vaporization of adipic acid, the following experiment has been carried out in connection with the synthesis of adiponitrile using the familiar packed tube method of vaporization to demonstrate this point more clearly. A reaction tube was mounted vertically in a suitable electric furnace and packed with successive 200 cc. layers of 8-14 mesh quartz and 8-14 mesh silica gel catalyst. The tube was heated to a temperature of 360° C. and a stream of ammonia passed through at the rate of 3 moles/hr. Adipic acid was introduced into the top of the tube at the rate of 60 g./hr. As the molten adipic acid trickled down through the quartz layer it was vaporized into the stream of ammonia and passed over the silica gel catalyst. This experiment was terminated after 16 hours by a partial carbon plug in the vaporizing section. The average conversion to adiponitrile over the first 8 hours of operation was 54.6% of theory as determined by analysis of the crude product collected during that period. The average conversion during the second 8 hours was only 45.5% of theory. These results show clearly the advantage of using the process of this invention in vaporizing adipic acid, since the yield of adiponitrile obtained is a reliable criterion of vaporizing efficiency.

We claim:

1. A process for vaporizing adipic acid which comprises bringing adipic acid in contact with the wall of a heated metallic heat transfer medium maintained substantially constantly at a temperature such that substantially instantaneous vaporization without appreciable concurrent decomposition of the adipic acid takes place.

2. A process for vaporizing adipic acid which comprises bringing adipic acid in contact with the wall of a heated metallic heat transfer medium maintained substantially constantly at a temperature above 312° C. such that substantially instantaneous vaporization without appreciable concurrent decomposition of the adipic acid takes place.

3. A process for vaporizing adipic acid which comprises bringing adipic acid in contact with the wall of a heated metallic heat transfer medium maintained substantially constantly at a temperature above 350° C. such that substantially instantaneous vaporization without appreciable concurrent decomposition of the adipic acid takes place.

4. A process for vaporizing adipic acid which comprises bringing adipic acid in contact with the wall of a heated metallic heat transfer medium maintained substantially constantly at a temperature above the boiling point of the acid such that substantially instantaneous vaporization without appreciable concurrent decomposition of the acid takes place.

5. A process for vaporizing adipic acid which comprises bringing adipic acid, in the presence of a carrier gas, in contact with the wall of a heated metallic heat transfer medium maintained substantially constantly at a temperature above the boiling point of the acid such that substantially instantaneous vaporization without appreciable concurrent decomposition of the acid takes place.

6. A process for vaporizing adipic acid which comprises conducting molten adipic acid in the form of fine droplets into contact with the wall of a heated metallic heat transfer medium which is maintained at a temperature such that substantially instantaneous vaporization of the adipic acid is effected with substantially no decomposition.

7. A process for vaporizing adipic acid which comprises conducting molten adipic acid in the form of fine droplets into contact with the wall of a heated metallic heat transfer medium which is maintained at a temperature above 312° C. such that substantially instantaneous vaporization of the adipic acid is effected with substantially no decomposition.

8. A process for vaporizing adipic acid which comprises conducting molten adipic acid in the form of fine droplets into contact with the wall of a heated metallic heat transfer medium which is maintained at a temperature above 350° C. such that substantially instantaneous vaporization of the adipic acid is effected with substantially no decomposition.

CRAWFORD H. GREENEWALT.
HOOD WORTHINGTON.